United States Patent
Chen

(10) Patent No.: US 7,236,482 B2
(45) Date of Patent: Jun. 26, 2007

(54) METHOD FOR CONTROLLING WIRELESS NETWORK ACCESS THROUGH WIRED NETWORK ACCESS INTERFACE AND ASSOCIATED COMPUTER SYSTEM

(75) Inventor: Chien-Tsun Chen, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 941 days.

(21) Appl. No.: 10/249,022

(22) Filed: Mar. 11, 2003

(65) Prior Publication Data

US 2004/0001470 A1    Jan. 1, 2004

(30) Foreign Application Priority Data

Jun. 27, 2002  (TW) ............................... 91114223 A

(51) Int. Cl.
*H04Q 7/24* (2006.01)
(52) U.S. Cl. .................. 370/338; 370/349; 370/469
(58) Field of Classification Search ............. 370/469, 370/338, 392, 349, 256, 463, 235, 328, 331; 709/249, 230, 224, 229; 711/131, 154, 161, 711/170
See application file for complete search history.

(56) References Cited

U.S. PATENT DOCUMENTS

| | | | |
|---|---|---|---|
| 6,839,872 B2* | 1/2005 | Kohda | 714/712 |
| 7,113,498 B2* | 9/2006 | Bajic | 370/338 |
| 2002/0083206 A1* | 6/2002 | Volpano | 709/249 |
| 2003/0185185 A1* | 10/2003 | Chang et al. | 370/338 |

* cited by examiner

*Primary Examiner*—Chau Nguyen
*Assistant Examiner*—K. Hartmann
(74) *Attorney, Agent, or Firm*—Winston Hsu

(57) ABSTRACT

A method of accessing a wireless network and associated computer system. The computer includes a memory, a wired network media access circuit for accessing a wired network, and a wireless network media access circuit, connected to the wired network media access circuit through a specific interface, for accessing a wireless network. A transmission memory space and a receiving memory space are allocated in the memory. According to a descriptor, the wired network media access circuit can access a control data and a packet data stored in the memory space allocated in the memory. The control data is for controlling the wireless network media access circuit, and for reflecting statuses of transmission and receiving of packet data.

18 Claims, 3 Drawing Sheets

METHOD FOR CONTROLLING WIRELESS NETWORK ACCESS THROUGH WIRED NETWORK ACCESS INTERFACE AND ASSOCIATED COMPUTER SYSTEM

BACKGROUND OF INVENTION

1. Field of the Invention

The present invention method relates to wireless network access and a related computer system, and more particularly, the present invention provides a method of controlling wireless network access through a wired network access interface and a related computer system.

2. Description of the Prior Art

In a modern information-age society, networks allow large amounts of data, information, multimedia and knowledge, in a form of digital electronic signals, to be transferred and exchanged. This promotes greater interpersonal communication, accumulation of experience, knowledge exchange, and technological advancement. Thus, networks have already become a foundation of the modern information-age society. Wired networks already having a broad, almost universal, foundation, wireless networks are now also rapidly being developed. Wired networks are typically more stable, and can ensure safety and privacy of information; wireless networks, on the other hand, break free from the chains of wired transmission, allowing users to access information sources at any time, in any place, in a mobile and portable way. As wired and wireless networks each have their respective peculiarities, it has become a priority of information technologists to allow users to access both types of networks at a lower cost and with more effective resources for a networked device.

Please refer to FIG. 1, which is a functional block diagram of a computer system 10 of the prior art. The computer system 10 is designed with a central processing unit CPU0, a Northbridge chip NB0, a Southbridge chip SB0, memory 12, a graphics accelerator card 16, a display 18, a peripheral device P0, and a storage device M0. In order to access a wired network 22A and a wireless network 22B, the computer 10 can be designed with a wired network card 20A and a wireless network card 20B. The wired network card 20A is compatible with the IEEE802.3 wired network specification. The central processing unit CPU0 is used to control operation of the computer 10; the Northbridge chip NB0 electrically connects the central processing unit CPU0, the memory 12, and the graphics accelerator card 16, and is used to manage a rapid information exchange between the three. The memory 12 is used to store, in a volatile fashion, information and programs needed while the central processing unit CPU0 is operating. The central processing unit CPU0 uses the graphics card 16 to process image data, and to send the image to the display 18, which then displays the image. The Southbridge chip SB0 connects the Northbridge chip to a plurality of buses (such as PCI, IDE, or USB). The peripheral device P0 (such as a sound card), the non-volatile storage device M0 (such as a CDROM drive or a hard disk drive), the wired network card 20A and the wireless network card 20B are on the buses. The Southbridge chip SB0 primarily manages lower-speed information transfer between the central processing unit CPU0 and the devices connected to the buses.

The wired network card 20A could be a network card that conforms to the IEEE802.3 local area network (LAN) specification. The wired network card 20A is designed with a media access circuit MAC1 and a physical layer circuit PHY1. The wireless network card 20B, on the other hand, could be a network card that complies with the IEEE 802.11 wireless local area network (WLAN) specification. The wireless network card 20B is also designed with a media access circuit MAC2 and a physical layer circuit PHY2. Under the open system interconnection (OSI) architecture, the media access circuit MAC1 and the media access circuit MAC2 are used to respectively implement respective media access control layers for the wired and wireless networks. When the computer 10 is used to access network resources, the media access circuits MAC1,2 can use the corresponding physical layer circuits PHY1,2 to acquire digital information, process the information, and send the information to the computer. Information that the computer 10 sends to the network is packaged by the media access circuit MAC1,2. The media access circuit MAC1,2 also arranges a physical location for the packaged information to access the network, and sends the packaged information to the physical layer circuit PHY1,2. Similarly, the media access circuit MAC1,2 unpacks information received by the physical layer circuit PHY1,2 from the network.

The physical layer circuits PHY1,2 of the wired and wireless network cards 20A,B are respectively used for providing wired and wireless physical layer functionality. Information to be sent to the network, after being processed by the media access circuit MAC1,2, is sent to the corresponding physical layer circuit PHY1,2, which converts the information to a signal suitable for transmission, and transmits the signal. The physical layer circuit PHY1,2 can also receive signals from the network and unpack or demodulate the signals to acquire information contained in the signals, then send the information to the corresponding media access circuit MAC1,2. The physical layer circuit PHY1 used for wired network access is connected to other computers on the wired network 22A (such as other terminals or a server) through a network cable 23. The physical layer circuit PHY2 used for wireless network access further comprises a baseband circuit and a radio frequency (RF) circuit. The baseband circuit performs digital processing on information received from the media access circuit MAC2, then the RF circuit wirelessly transmits the information. RF wireless frequency signals received from the wireless network are received by the RF circuit. Then, the baseband circuit converts the demodulated signal to electronic information that is sent to the media access circuit MAC2.

When the computer 10 accesses network resources, all network cards work with a driver program stored in the memory 12. The driver program manages data transfer between the computer 10 and the network. Taking the wired network card 20A as an example, when the computer 10 starts accessing the wired network 22A, the wired network driver 26A in the memory 12 establishes a plurality of ordered descriptors TxA (with individual descriptors indicated as TxA (1) through TxA(n1)) and a corresponding ordered descriptors RxA (with individual descriptors indicated as RxA(1) through RxA(m1)). The driver program 26A then allocates free space in the memory 12, such as a data transmission allocation DTA and a data reception allocation DRA. Each descriptor TxA,RxA is a pointer used to keep track of a corresponding memory allocation address to which it points. When the computer 10 sends a large amount of information to the wired network 22A, the computer 10 uses the wired network driver 26A to store the information to the data transmission allocation DTA and sets a descriptor TxA (such as TxA(1)) to point to the memory space. When the media access circuit MAC1 of the wired network card 20A begins transfer of the information to the wired network 22A, the media access circuit MAC1 uses the descriptor TxA in the memory 12 to find the information stored in the data transmission allocation DTA, and reads the information from the data transmission allocation DTA. Then, the media allocation circuit MAC1 adds a header and a footer (such as a frame check sequence (FCS)) to package the information, then uses the physical layer circuit PHY1 to send the packaged information to the wired network 22A. If a single data transmission allocation DTA is not enough to completely store the information, the information is broken up and stored in a plurality of data transmission allocations DTA, and a plurality of descriptors TxA point to the respective data transmission allocations DTA. For example, if the information is to be stored in three different data transmission allocations DTA, the wired network driver 26A arranges three linked descriptors TxA(1), TxA(2), and TxA (3) to point to the three allocations DTA, and adds "continue" flags to the first two descriptors TxA(1) and TxA(2) to tell the media access circuit MAC1 that after processing this allocation DTA, the next allocation DTA must also be processed. And, a "stop" flag is added to the third descriptor TxA(3) to tell the media access circuit MAC1 not to access further allocations, i.e. those pointed to by TxA(4) and above, after finishing with the current allocation. Through the method described above, the media access circuit MAC1 can correctly access the data transmission allocations DTA, pointed to by the descriptors TxA(1), TxA(2) and TxA(3), to read the information in the memory 12 to be transmitted to the wired network 22A. In practical application, the media access circuit MAC1 has a direct memory access (DMA) engine that allows the media access circuit MAC1 to directly access the information stored in the memory 12, saving resources of the central processing unit CPU0 and increasing information access speeds and efficiency.

Similar to the system described above for managing data transmission, the wired network driver 26A also allocates the descriptors RxA in memory 12 for managing received information. Each descriptor RxA has a pointer pointing to a corresponding data reception allocation DRA. When the wired network card 20A receives information transmitted to the computer 10 through the wired network 22A, the wired network card 20A also works with the wired network driver 26A to store the unpacked information to the allocation DRA, and similarly sets a descriptor RxA (such as RxA(1)) to point to the allocation DRA. In this way, the central processing unit CPU0 can read the information received from the wired network 22A from the allocation DRA that is pointed to by the descriptor RxA(1). Similar to the transmission control system, if the wired network card 20A must store the received information in a plurality of allocations DRA, the wired network card 20A also works with the wired network driver 26A to set a plurality of descriptors RxA to point to the corresponding allocations DRA. Preferably, the descriptor TxA and the descriptor RxA are both set to types corresponding to an architecture of the transmitted or received data. Taking the descriptor TxA as an example, as information to be sent to the wired network 22A is sequentially stored to different allocations DTA, the wired network driver 26A accordingly sets each descriptor TxA (1), TxA(2), and so on, to point to different allocations DTA. The wired network card 20A also accesses each allocation DTA pointed to by a pointer according to the sequence of the descriptors TxA(1), TxA(2), and so on. This happens until the last descriptor TxA(n1) is reached, at which point, the wired network driver 26A loops back to the first descriptor TxA(1), and continues to set the descriptors TxA(1), TxA(2) in sequence to point to following allocations DTA of the stored transmitted information. The media access circuit MAC1 of the wired network 22A also accesses each allocation DTA pointed to by the descriptors TxA according to the looped sequence. The descriptors RxA are also used in the looped style described above.

As with the principles described above for access of the wired network 22A, the prior art computer 10 also uses a wireless network driver 26B with the wireless network card 20B to allocate a plurality of descriptors TxB (indicated individually as TxB(1) through TxB(n2)) and a plurality of descriptors RxB (indicated individually as RxB(1) through RxB(m2)) for pointing to a data transmission allocation DTB and a data reception allocation DRB. Information to be sent to the wireless network 22B is stored in the memory allocation DTB pointed to by the descriptors TxB, and information received from the wireless network 22B is stored in the memory allocation DRB pointed to by the descriptors RxB. For the computer 10 to access the wireless network, the media access circuit MAC2 and the central processing unit CPU0 use the descriptors TxB and RxB to access the information sent to the wireless network, and received from the wireless network, stored in the memory 12.

Although the wired network card 20A and the wireless network card 20B both use descriptors to manage network-accessible information, the descriptors used to access the wired network (TxA and RxA) and the descriptors used to access the wireless network (TxB and RxB) have different information structures. To accommodate special demands of the wireless network, the descriptors TxB and RxB used for accessing the wireless network must further indicate a particular status of the wireless network. For example, because the wireless network 22B and the computer 10 are not connected by a physical network cable, when the computer 10 transmits a large amount of wireless information to the wireless network 22B, the computer 10 has no way of confirming that the information sent wirelessly by the wireless, network card 20B has already been received smoothly by another computer on the wireless network 22B. At this time, the central processing unit CPU0 requests that the wireless network 22B send to the computer 10 an acknowledgement of data having been received completely. In practice, when the central processing unit CPU0 uses the wireless network driver 26B to store the information to the memory allocation DTB, the central processing unit CPU0 arranges the descriptor TxB to point to the memory allocation DTB, and the descriptor TxB indicates the acknowledgement required by the wireless network 22B. When the media access circuit MAC2 of the wireless network card 20B accesses the information according to the descriptor TxB, the media access circuit MAC2 uses the descriptor TxB to know to request acknowledgement from the wireless network 22B. In this way, when the media access circuit MAC2 packages the information, the media access circuit MAC2 adds acknowledgement information to the head of the packet. The packet is then sent to the physical layer PHY2, and the physical layer PHY2 sends the packet wirelessly to the wireless network 22B.

Practically speaking, in an architecture such as IEEE 802.11, aside from the acknowledgement request, there are a number of settings that are different from those of the wired network. For example, as information is transmitted wirelessly, in addition to the transmitter and the receiver, any third party that can receive wireless signals could intercept the wirelessly transmitted information. In order to ensure that the information content does not leak, the IEEE 802.11 architecture provides a wired-equivalent privacy (WEP) mode, which encrypts transmitted and received information at both ends, and maintains basic information security. The central processing unit CPU0 also uses the descriptors TxB and RxB to govern whether or not the media access circuit MAC2 uses WEP to access network resources. Also, in order to adapt to a portable nature of computers employing the wireless network architecture, in the wireless network architecture, each computer connects to the network at an access point. More specifically, when the computer 10 accesses information on the wireless network 22B, the computer 10 establishes contact to get a basic service set (BSS) organized by an access point. The basic service set can comprise a plurality of computers, all connected wirelessly to the BSS through connection to the access point. A physical wireless network address of the access station could act as a basic service set identification (BSSID). When a first computer in a first basic service set connects to a second computer of a second BSS, the first computer first contacts an access point of the first BSS. The access point of the first BSS connects to an access point of the second BSS through a distribution system service (DSS), then connects to the second computer through the second access point, allowing the first computer to contact the second computer. In the wireless connection process just described, each computer must make contact with a respective access point, enter/exit the BSS, access the DSS through the access point, etc. And all of these matters occur between the computers and the access points with the help of management and control framework information, such as BSSID's, acknowledgements, and beacons. In the prior art architecture of FIG. 1, many internal control and management signals must be produced between hardware internal to the computer 10, and are made known to the central processing unit CPU0 and the media access circuit MAC2 through the descriptors TxB and RxB. In contrast, in wired network access, because data transfer has a safe path through network cables, the access control system can be relatively simple, and the descriptors used by the wired network need not be as complicated as their wireless counterparts. Thus, the two types of descriptors used in the prior art are certainly not similar, and cannot share software and hardware resources.

Due to the above-mentioned differences in accessing the wired network 22A and the wireless network 22B, the descriptors TxB and RxB used for wireless network access and the descriptors TxA and RxA used for wired network access are neither similar nor compatible. And, when the prior art computer 10 needs to simultaneously access both wired and wireless network resources, the wired network driver 26A and the wireless network driver 26B must individually allocate descriptors used by both the wired network and the wireless network. In a modern, highly networked information society, networking power has already become a fundamental computer requirement. Effectively integrating wired and wireless network access capabilities, and simplifying wireless and wired network access control systems has also become a goal of information industry research and development. However, in the prior art, integration of wired and wireless network access is not possible because the forms of the respective descriptors are different. Similarly, as the descriptors allocated by the wired and wireless network drivers are not compatible, the media access circuits MAC1 and MAC2, which must get information related to network access from the descriptors, are difficult to integrate as simplified circuits.

SUMMARY OF INVENTION

Therefore, it is an object of the claimed invention to provide a method of using a wired network access interface to control wireless network access, and related devices, for integrating wired and wireless network access in a terminal, and simplifying network access installation.

Briefly, the claimed invention method integrates a wireless network driver into a wired network driver, which uses wired network access descriptors, and memory allocations pointed to by the descriptors, to control wired and wireless network access. As for hardware, a wired network access media access circuit is integrated into a Southbridge, allowing a wired network card to be minimally fitted with a wired network access physical layer circuit. A wireless network card is connected to the wired network media access circuit. When a computer controls wireless control access, the computer first must first record control and management information of the wireless descriptors as control information, and merge the control information with wireless network access information to be stored in the memory allocations pointed to by the wired network descriptors. The media access circuit of the wired network, in cooperation with the wired network driver, uses the descriptors to acquire the wireless network access control information and information to be accessed on the wireless network and send the information to the wireless network card, which can then to send the information to be accessed on the wireless network to the wireless network in accordance with the wireless network access control information. When the wireless network card receives information and a control response from the wireless network, the wireless network card can also write the information and the response to the memory allocations pointed to by the wired network card descriptors, allowing a central processing unit (CPU) of the computer, in coordination with the wired network driver, to access the information sent by the wireless network.

The claimed invention also provides a computer system that has a central processing unit (CPU), a memory for temporarily storing information needed by the CPU during operation, and an integrated wired network media access circuit chip coupled to the CPU and the memory. The computer system can cheaply incorporate a wireless network card having a wireless network media access circuit and a physical layer circuit. The wireless network media access circuit is coupled to the physical layer circuit, and coupled to the wired network media access circuit chip by a medium independent interface (MII), allowing communication with the wired network media access circuit. The wired network driver of the wired network media access circuit requests the computer system to allocate space in the memory during power-on. Preferably, the allocated space includes a transfer allocation and a reception allocation. The wireless network media access card accesses control information and data packets through the interface and the wired network media access circuit.

It is an advantage of the claimed invention that wired and wireless network access hardware and software are integrated and simplified, and terminal network access functionality is increased.

These and other objectives of the claimed invention will be apparent to those of ordinary skill in the art after reading the following detailed description of the preferred embodiment, which is illustrated in the various figures and drawings.

DETAILED DESCRIPTION

Figure 2:
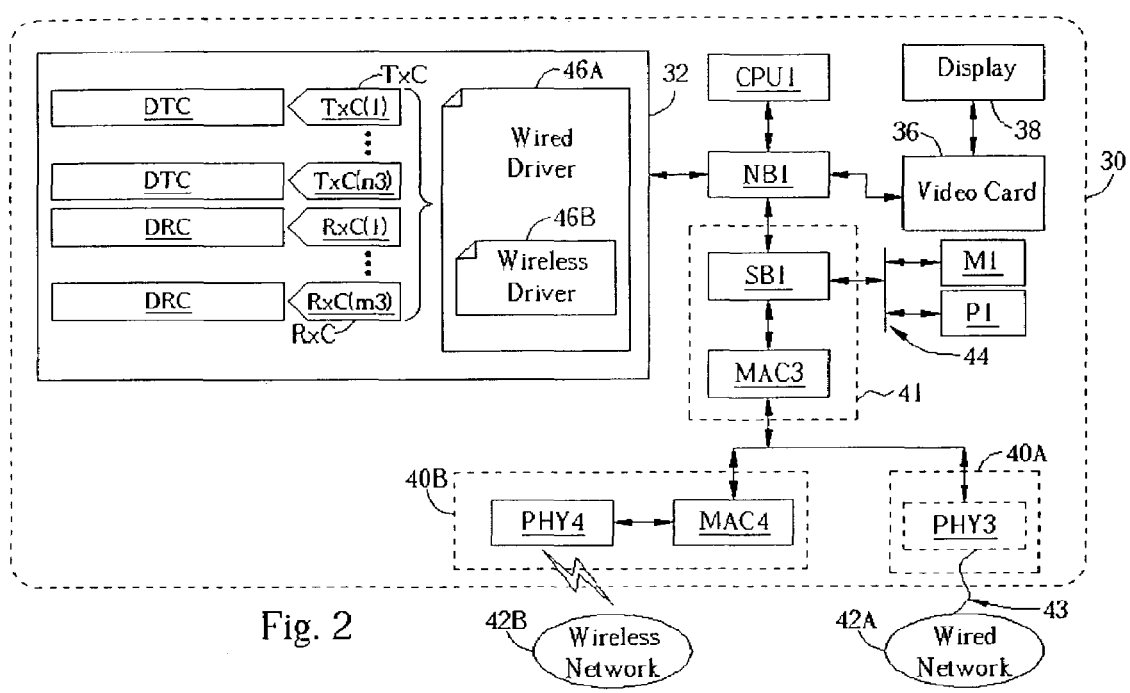
FIG. 2 is a functional block diagram of a computer system of the present invention.

Please refer to FIG. 2, which is a functional block diagram of a computer system 30 according to the present invention. The computer system 30 comprises a central processing unit (CPU) CPU1, a Northbridge NB1, a Southbridge SB1, a graphics accelerator 36, a display 38, a memory 32, a storage device M1, and a peripheral device P1. For access of a wireless network 42B, the computer system 30 may also comprise a wireless network card 40B. The CPU CPU1 is used for controlling operation of the computer 30. The memory 32 is used for volatile storage of information and programs used by the CPU CPU1 during operation. The computer 30 processes images through the graphics accelerator card 36, then the accelerator card 36 sends the processed image to the display 38 for display. The Northbridge NB1 is electrically connected between the memory 32, the CPU CPU1, and the graphics accelerator 36, and coordinates data transfer between said components. The storage device M1 (hard disk drive, optical drive, etc.) for non-volatile information storage, and the peripheral device P1 (mouse, keyboard, sound card, etc.) are connected to the Southbridge SB1 through a bus (USB, PCI, etc.). The Southbridge SB1 controls low-speed data transfer between said components and the Northbridge NB1.

Figure 1:
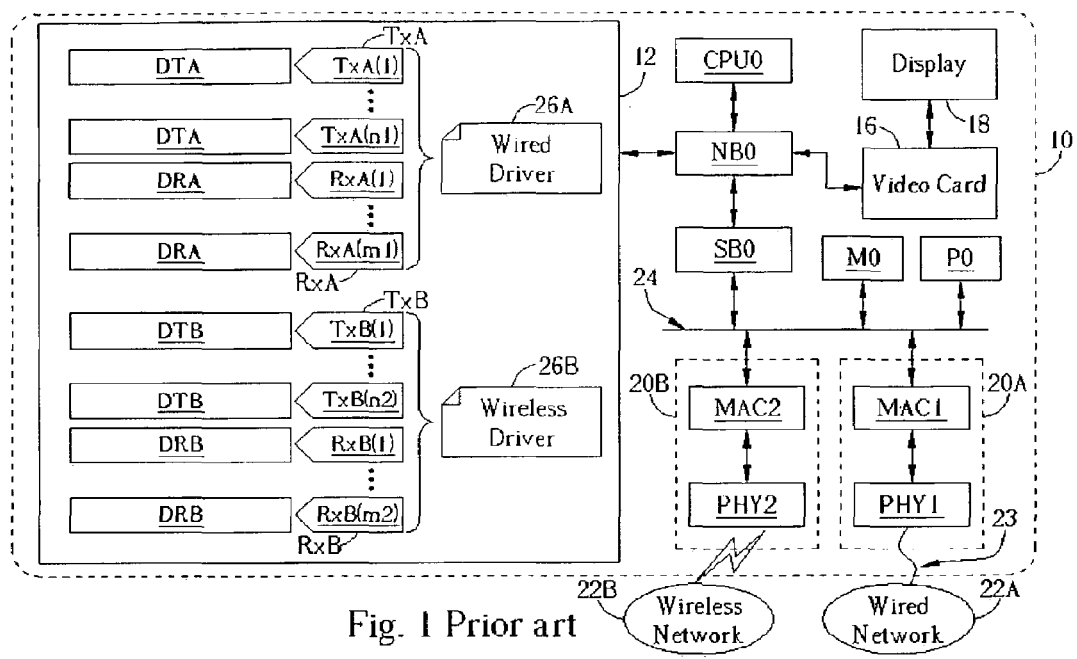
FIG. 1 is a functional block diagram of wired and wireless network access in a prior art computer system.

In the preferred embodiment of the present invention, a media access circuit MAC3 for accessing a wired network (an IEEE 802.3 specification LAN, perhaps) can be integrated with the Southbridge SB1 into a Southbridge chip 41. In this way, the wired network card 40A need only comprise a wired network physical layer circuit PHY3 to be connected to a wired network 42A by a network cable 43. The media access circuit MAC3 is a wired network circuit, which, in coordination with the physical layer PHY3 of the wired network card 40A, can respectively achieve functionality required of a media access control layer and a physical layer of an Open System Interconnect (OSI) network architecture, allowing the computer 30 to access wired network resources. Similar to the wired network access case shown in FIG. 1, when the computer 30 accesses the wired network 42A, the CPU CPU2 loads and executes a wired network driver 46A in the memory 12, and allocates wired network descriptors TxC and RxC (referred to individually as TxC (1)-TxC(n3) and RxC(1)-RxC(m3)) in the memory 12. Each descriptor TxC and RxC points to a data transfer allocation or a data reception allocation, respectively. When the computer 30 sends information to the wired network 42A, the computer 30 works in cooperation with the wired network driver 46A to store the information to one or a plurality of the data transfer allocations DTC, and arrange the descriptors TxC to point to the data transfer allocations DTC in which the information is stored. The wired network media access circuit MAC3 can then, in accordance with the descriptors TxC in the memory 32, use a directed memory access (DMA) engine, inherent to the media access circuit MAC3, to access the information to be sent to the wired network 42A from the memory 32. After the wired network media access circuit MAC3 packets the information, the information can be sent to the wired network physical layer circuit PHY3, and the wired network physical layer circuit PHY3 sends the information to the wired network 42A after encoding. Similarly, information sent to the computer 30 over the network cable 43 from the wired network 42A, after being received and decoded by the wired network physical layer circuit PHY3, is then returned to the wired network media access circuit MAC3. After the wired network media access circuit MAC3 unpacks the information, the unpacked information can then be stored in one or a plurality of the data reception allocations DRC by the wired network driver 46A, and the descriptors RxC are set to point to the allocations DRC in which the information is stored. In this way, the central processing unit CPU1 can acquire the information sent over the wired network 42A from the data allocations DRC pointed to by the descriptors RxC.

The wireless network card 40B used for wireless network access comprises a wireless network media access circuit MAC4 and a wireless network physical layer circuit PHY4, which respectively achieve functionality of a wireless network media access control layer and physical layer. A major difference between the present invention and the prior art is that the present invention connects the wireless network media access circuit MAC4 to the wired network media access circuit MAC3, causing the wired network media access circuit MAC3 to take the wireless network media access circuit MAC4 as a physical layer circuit (similar to the wired network physical layer circuit PHY3), allowing wireless network transfer to use software and hardware resources of the wired network media access circuit MAC3. Furthermore, the wired network media access circuit MAC3 can use the MII to send information accessed by the DMA engine to the wired network card 40A (and conveniently use the wired network), or to the wireless network card 40B for transmission to the wireless network 42A. In cooperation with this type of hardware architecture, the wireless network driver 46B is also integrated into the wired network driver 46A. The wired network driver 46A senses whether the wired network media access circuit MAC3 is accessing the wired network physical layer circuit PHY3 or the wireless network media access circuit MAC4 of the wireless network card 40C, which is being used as a physical layer circuit, and decides whether or not to load the wireless network driver 46B. In this way, the wired network access interface provided by the wired network driver 46A and the wired network media access circuit MAC3 can be used to control wireless network access of the computer 30.

As described above, the descriptors used in the wireless network access of the prior art not only point to memory allocations, but also contain internal control information specially designed for wireless network access. Control signals and status signals must be produced between the internal hardware of the computer, but these signals cannot be commonly stored in the descriptors used for wired network access. So, when the present invention uses the wired network access interface to control wireless network access, the signals described above are categorized as control information, and stored in the memory allocations pointed to by the descriptors used in wired network access. Please refer to FIG. 3, in cooperation with FIG. 2, which is a diagram showing an architecture of information stored in the memory 32 and related to using the wired network access interface to control wireless network access. When the computer 30 sends information to the wireless network 42B, the wireless network driver 46B in the wired network driver 46A packets the information as data packets 50A. The data packets 50A can be divided into a plurality of sections. The information to be sent to the wireless network is seen as a data payload, and is recorded in a data payload area DP. And, the internal control information accessed by the wireless network card 42B is collected in a control information area CTx of the data packet 50A. In the preferred embodiment of the present invention, the wireless network driver 46B produces different ID codes according to the different data payloads, making each group of information to be sent to the wireless network 42B have a unique ID code. And, the control information area CTx comprises an ID code field ID0, which is used to record the ID code. Additionally, like above, whether using wireless or wired access, the respective wireless or wired network driver adds a header to the information to be sent to the network to packet the information. Then, the respective physical layer circuit sends the packaged information to the network. In the present invention, corresponding to the information to be sent to the wireless network that is recorded in the data payload area DP, is a header that the wireless network driver 46B decides to use for wireless network access. And, this header corresponding to the data payload is recorded in a header area H or the data packet 50A.

Figure 3:
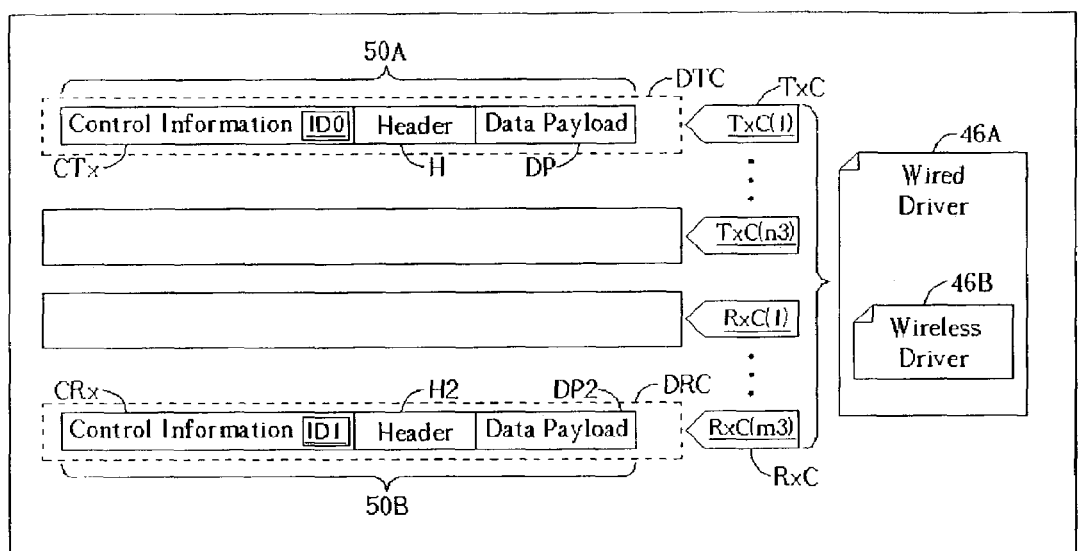
FIG. 3 is a diagram of information in a memory when the computer system of FIG. 2 performs wireless network access.

After the wireless network driver 46B packets the data payload and the other wireless network access control information in the packet 50A, the wireless network driver 46B can store the packet 50A in one (or a plurality) of the data transfer allocations DTC, and assign corresponding wired network descriptors TxC to point to the allocations DTC, as shown in FIG. 3. In other words, although the information in the packet 50A is to be sent to the wireless network 42B, in the present invention, the packet 50A is temporarily seen as information to be sent to the wired network 42A, and temporarily stored in the memory allocations pointed to by the descriptors TxC. In cooperation with the wired network driver 46A and the wired network access descriptors TxC, the wired network media access circuit MAC3 can use DMA to access the packet 50A in the memory 32, and send the packet 50A to the wireless network card 40B. After the wireless network media access circuit MAC4 receives the packet 50A, the control information used for wireless access can be read from the control information area CTx of the packet 50A, the header used for wireless network transfer can be read from the header area H, and the data payload can be read from the data payload area. Then, the wireless network media access circuit MAC4 can use the header to package the data payload, and the wireless network media access circuit MAC4 and the wireless network physical layer circuit PHY4 can be controlled, according to the wireless network access control information, to send the packaged data payload wirelessly to the wireless network 42B.

After the wireless network card 40B has received the information sent from the wireless network, the wireless network media access circuit MAC4 packages the header, data payload, and related wireless access control information into a header area H2, a data payload area DP2, and a control information area CRx, respectively, of an data packet 50B, and send the packet 50B to the wired network media access circuit MAC3. The wired network media access circuit MAC3 uses the DMA engine to store the packet 50B to one, or a plurality, of the data reception allocations DRC, and sets corresponding wired network descriptors RxC to point to the allocations DRC, as shown in FIG. 3. In this way, the central processing unit CPU1 can use the descriptors RxC to read the information sent from the wireless network 42B. Like above, when the computer 30 is interacting with the access point, the interaction is accomplished in light of the management and control frame information. And, many internal control signals and status data must be produced between each internal component of the computer 30. When the wireless network card 40B produces the control information, the wireless network card 40B can record related control and management items in the control data area CRx of the packet 50B. For example, the wireless network card 40B inspects each incoming packet to determine whether or not the packet encountered an error in the transfer process, then produces a packet reception status. The wireless network driver 46B can also read the control and management information of the packet 50B through the wired network pointers RxC of the wired network driver 46A, and respond to the problem.

Furthermore, similar to the packet 50A, the control information area CRx of the packet 50B, produced by the wireless network media access circuit MAC4 in response to information received over the wireless network 42B, comprises an ID code field ID1. Like above, when the computer 30 sends preliminary information to the wireless network 42B, an ID code is produced for the information, and the computer 30 can request an acknowledgement frame from the wireless network 42B. When the wireless network media access circuit MAC4 receives the response regarding the preliminary information from the wireless network 42B, the transfer status of the information and the current reception status of the packet, along with the related ID code, can be merged and packed into the control information area of the received data packet. The wireless network driver 46B can use the wired network driver 46A. Or, after the wireless network card 40B sends out each packet, an acknowledgement frame such as that described above is expected in a set period of time. If the acknowledgement frame has not been received in the set period of time, the wireless network card 40B retries sending the information. After failing a set number of times, the wireless network card 40B produces related internal control and management information, and uses the wired network media access circuit MAC3 to perform DMA and store the internal control and management information to the memory allocations pointed to by the descriptors, thus reporting the information that failed to transfer to the host computer. In other words, if the data payload of the data packet 50B of FIG. 3 is the response information made by the wireless network about the data payload of the data packet 50A, the ID code recorded by the wireless network media access circuit MAC4 in the ID code field ID1 of the packet 50B is the same as the ID code recorded in the ID code field ID0 of the packet 50A. In this way, after the central processing unit CPU1, according to the descriptors RxC, reads the information sent over the wireless network 42B, the ID code can be used to determine whether or not the information corresponds to information already sent to the wireless network 42B. Additionally, information such as whether or not the wireless network card 40B already successfully sent the information to the wireless network 42B, whether or not the packet received by the wireless network card 40B has errors related to network transfer, or reception status information, can all be recorded in the control information area according to ID code. In this way, the response of the wireless network card 40B to access of the wireless network 42*b* can be sent through the wired network interface and found by the central processing unit CPU1.

In addition, the wireless network driver 46B, through the wired network driver 46A, can use DMA to transfer data packets, send the packets to the wired network media access circuit MAC3, then to the wireless network card 40B. The wireless network card 40B extracts control and management information from the packet, so as to perform hardware control on the wireless network media access circuit MAC4 and the wireless network physical layer circuit PHY4. For example, transfer rate, power level, and modulation type can all be controlled in hardware. In IEEE802.11, complementary code key (CCK) and packet binary convolution coding (PCBB) are possible modulation types.

From the above, one could figure out that the present invention uses the wired network access interface to control wireless network access. Control commands for controlling the wireless network media access circuit MAC4 and data payloads are stored in the memory allocations used for wireless network access according to a type of the packet. The packet is sent to the wireless network media access circuit MAC4 through the wired network access interface, and the wireless network media access circuit MAC4 can then access the wireless network according to the control commands. The network media access circuit MAC4, through the wired network interface, stores the response of the wireless network to the memory allocations used for wired network access, allowing the computer 30 to manage wireless network access responses (such as data transfer and reception status) through the descriptors of the wired network.

Advantages of the present invention can be given as the following. First, wired network access and wireless network access can always be controlled through use of the wired network access interface (the wired network driver 46A and the wired network media access circuit MAC3), allowing simplification of allocations in the memory 32, combining the wired and wireless network drivers, and simplifying the software architecture. In addition, in order to use the wired network access interface to control wireless network access through the control and management information, the control and management information, originally processed by the wireless network media access circuit hardware MAC4, is processed in the present invention when the central processing unit CPU1 executes the wireless network driver software 46B. In other words, the wireless network driver 46B first prepares the control and management information used for wireless network data transfer, then the control and management information is sent to the wireless network media access circuit MAC4 through the wired network access interface according to the control and management information type. And, the control and management information returned by the wireless network is stored in the memory 32 through the wired network access interface according to the control and management information type, allowing the wireless network driver 46B to decide how to perform following communication. In this way, the hardware circuit functions of the wireless network media access circuit MAC4 are partially shared by the wired network media access circuit MAC3 and the network drivers, allowing the wireless network media access circuit MAC4 to be simplified, so that the design, production, and manufacturing costs of the wireless network card 40B can be lowered. Moreover, in the preferred embodiment, the wired network media access circuit N4AC3 and the wireless network media access circuit MAC4 are connected by the medium independent interface (MII), whose hardware specification is simpler than that of the PCI bus, freeing the wireless network media access circuit MAC4 from connecting to the Southbridge chip 41 through the complicated PCI bus, and further simplifying the circuit architecture of the wireless network media access circuit MAC4. A simplified MII comprises a high data transfer rate bus and a low transfer rate transmission control command path. The interface connecting the wired network media access circuit MAC3 and the wireless network media access circuit MAC4 may be a dedicated interface. However, in the present invention, because the computer 30 always uses the control and management information in the data packets to control and manage the wireless network media access circuit MAC4, this allows the control and management information to use the high data transfer rate bus of the MII to control and manage the wireless network media access circuit MAC4. So, not only is the present invention able to take advantage of the simple architecture of the MII, but it also need not sacrifice efficiency of control and management of the wireless network media access circuit MAC4. Additionally, though the MII, because of the less demanding specification, does not provide for disconnection, in order to allow the central processing unit CPU1 to process the internal control and management information sent by the wireless network card, the present invention categorizes wireless data transfer status as control and management information (such as the control information CRx of FIG. 3), allowing the central processing unit CPU 1, through the high bandwidth of the MII, to acquire the status of the wireless data access, or to perform related hardware control.

In the prior art, wired and wireless network access hardware and software are incompatible, making integration of wired and wireless network access impossible, and causing a wasteful redundancy of hardware and software resources. In contrast, the preferred embodiment of the present invention integrates the wired network access circuit of the Southbridge chip and the wired network driver into the wired network access interface. The access interface can be used to control wired and wireless network access. Hardware and software resources used for wired and wireless network access are effectively integrated, and the hardware and software architectures are simplified, allowing the computer to have, concurrently, wired and wireless network functions, and allowing greater sharing of network resources.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of accessing a wireless network, used in a computer, the computer comprising a wired network media access circuit coupled to a wireless network access circuit through an interface, the method comprising:
   a wired network driver of the wired network access circuit requesting the computer to allocate a memory allocation in a memory; and
   the wireless network media access circuit storing control and management information and a data packet to the memory through the interface and the wired network media access circuit;
   wherein the control and management information comprises an identification code, a data packet transfer status associated with the identification code, and a receive status of the data packet.

2. The method of claim 1 wherein the interface is a dedicated interface.

3. The method of claim 2 wherein the interface is a media independent interface (MII).

4. The method of claim 2 wherein the memory allocations comprise a transmission memory allocation and a reception memory allocation.

5. The method of claim 4 wherein the wireless network media access circuit is coupled to a physical layer circuit, the wireless network media access circuit receives the data packet from the wireless network, produces the control and management information, and stores the data packet and the control and management information in the memory allocations.

6. The method of claim 5 wherein the wireless network media access circuit stores the control and management information and the data packet to the reception memory allocation according to a descriptor.

7. The method of claim 4 wherein the wireless network media access circuit is coupled to a physical layer circuit, the wireless network media access circuit controlling the wireless network media access circuit and the physical layer circuit to access the wireless network according to the control and management information.

8. The method of claim 7 wherein the wireless network media access circuit reads the control and management information and the data packet from the transmission memory allocation according to a descriptor.

9. The method of claim 7 wherein the wireless network media access circuit controls an access rate, a power level, and a modulation scheme according to the control and management information.

10. A computer system comprising:
a central processing unit (CPU) for controlling operations of the computer system;
a memory for temporarily storing information needed when the CPU is operating;
a chipset comprising an integrated wired network media access circuit, and coupled to the CPU and the memory; and
a wireless network media access circuit, coupled to the chipset by an interface, for communicating with the wired network media access circuit;
wherein a wired network driver of the wired network media access circuit requests the computer to allocate a memory allocation in the memory; and the wireless network media access circuit accesses a data packet and control and management information comprising an identification code, a data packet transfer status related to the identification code, and a data packet receive status of the memory allocation through the interface and the wired network media access circuit.

11. The computer system of claim 10 wherein the interface is a dedicated interface.

12. The computer system of claim 11 wherein the interface is a media independent interface (MII).

13. The computer system of claim 11 wherein the memory allocation comprises a transmission memory allocation and a reception memory allocation.

14. The computer system of claim 13 wherein the wireless network media access circuit is coupled to a physical layer circuit, the wireless network media access circuit receives the data packet from the wireless network, produces the control and management information, and stores the data packet and the control and management information to the memory allocation.

15. The computer system of claim 14 wherein the wireless network media access circuit stores the control and management information and the data packet to the reception memory allocation according to a descriptor.

16. The computer system of claim 13 wherein the wireless network media access circuit is coupled to a physical layer circuit, and the wireless network media access circuit controls the wireless network media access circuit and the physical layer circuit to access the wireless network, according to the control and management information.

17. The computer system of claim 16 wherein the wireless network media access circuit reads the control and management information and the data packet from the transmission memory allocation according to a descriptor.

18. The computer system of claim 16 wherein the wireless network media access circuit controls an access rate, a power level and a modulation scheme according to the control and management information.

* * * * *